UNITED STATES PATENT OFFICE.

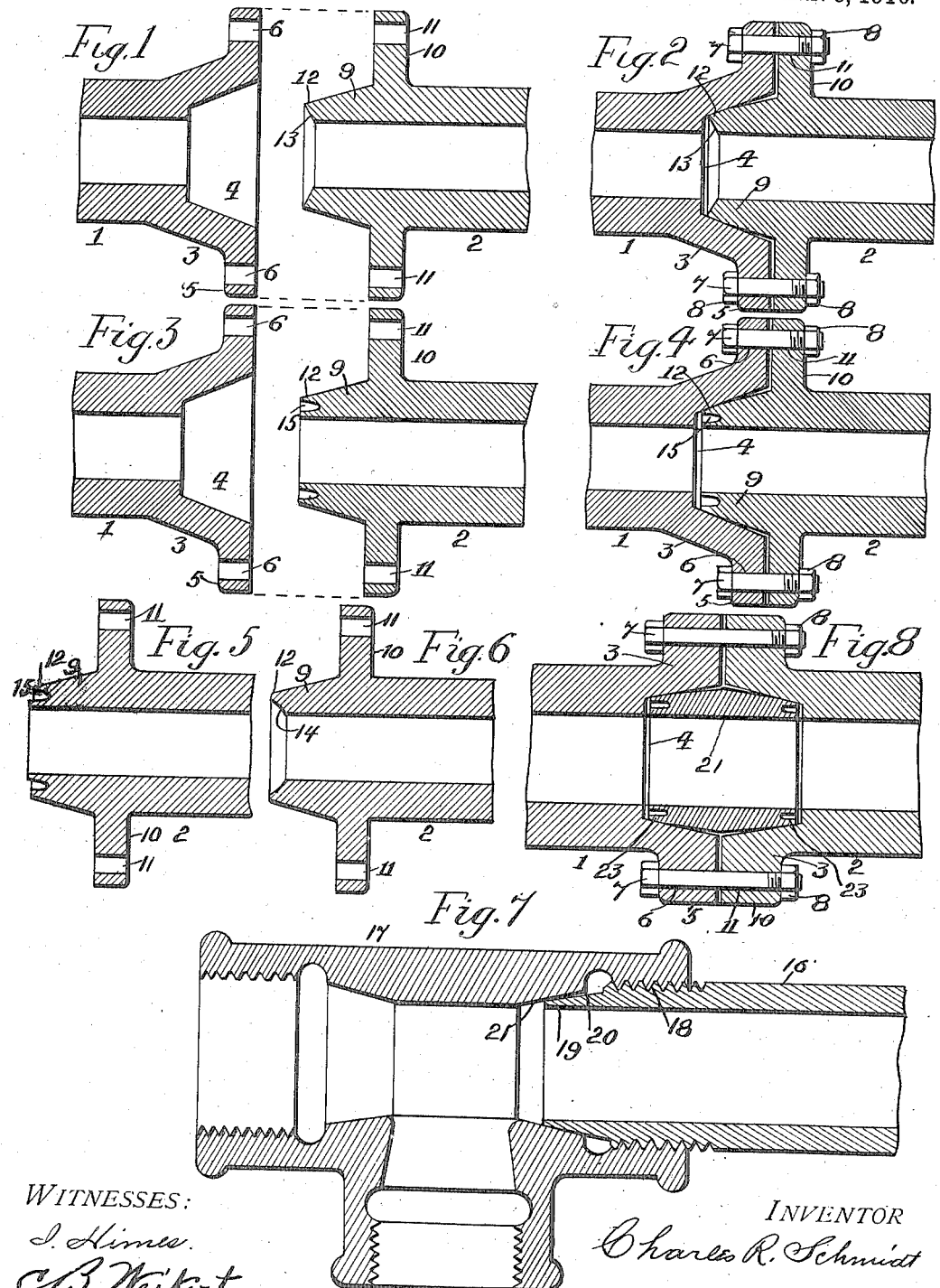

CHARLES R. SCHMIDT, OF BALTIMORE, MARYLAND.

PIPE-COUPLING.

951,704.  Specification of Letters Patent.   Patented Mar. 8, 1910.

Application filed December 14, 1906. Serial No. 347,860.

*To all whom it may concern:*

Be it known that I, CHARLES R. SCHMIDT, a citizen of the United States, residing at Baltimore, in the State of Maryland, have invented certain new and useful Improvements in Pipe-Couplings, of which the following is a specification.

This invention has relation to pipe couplings, and relates in particular to couplings for cast iron pipes of the faucet and spigot type, wherein the faucet or bowl and spigot ends of adjacent sections are tapered and machined or ground to produce a tight joint. In couplings of this kind it has been customary to form the external surface of the spigot end and the internal surface of the faucet end on the same taper. Theoretically this should produce a perfectly tight joint, but it has been found that the constant wear of the tools employed in machining the joint sections, the expansion and contraction of the metal of which the sections are formed and other causes, render such joints, in a majority of cases, liable to leak and if made tight at all they are only made so by excessive strain, which often bursts the faucet end. Another defect quite common in couplings of the faucet and spigot type, is that the meeting parts not being perfectly joined so as to afford a considerable area of contacting surfaces, corrosion from chemical or electrolytic action results and the joint is thereby rendered leaky. Another objectionable feature of this type of joint is that the several sections must, in order to secure a reasonably tight joint, be arranged with their longitudinal axes in absolute alinement.

In carrying my invention into effect I so fashion or form one of the ends of each cast metal pipe section, preferably the spigot end, that it will possess sufficient elasticity to yield somewhat under the stress of the connecting devices and provide a perfectly tight joint whether or not the meeting ends are perfectly machined or ground and permit of the sections being laid at somewhat of an angle to one another and also provide a surface contact of considerable area, so as to secure good electrical conductivity at the joint.

I have illustrated my invention in the accompanying drawing wherein:

Figure 1 is a sectional view showing the faucet and spigot ends of the sections of pipe, separated to clearly show the construction of each. Fig. 2 is a similar view of the same sections joined together. Fig. 3 is a view similar to Fig. 1, but showing a modified construction of my improvement. Fig. 4 is a view similar to Fig. 2, of the construction shown in Fig. 3. Fig. 5 is a view similar to Figs. 2 and 4 of another modified form of my improvement. Figs. 6 and 7 are views similar to Figs. 1, 3 and 5 of other modified forms of my improvement. Fig. 8 is a sectional view of a modification.

In Figs. 1 and 2 the section having the faucet end is designated 1 and the section having the spigot end is designated 2 and these sections will hereinafter be called the faucet section and spigot section respectively. The faucet section 1 is provided with the faucet end 3, having the internally tapered socket 4, and is also provided with the lateral flange 5, pierced at 6 for the passage of bolts 7, upon which are screwed nuts 8, these bolts and nuts serving to connect and draw together the two sections as will be presently described. The spigot section 2 is provided with the externally tapered integral spigot end 9 and with the lateral flange 10, pierced at 11, for the passage of the bolts 7.

It will be observed on careful inspection of the drawing that the socket 4, in the faucet section 1, and the spigot end 9, of the spigot section 2, are differently tapered, that is to say the angle of the internal wall of the socket 4 is different from the angle of the external surface of the spigot end 9, the former being at a more obtuse angle, to the horizontal axis of the pipe than the latter. This constitutes an important feature of construction in my improvement and I prefer to have the angles of the respective contacting surfaces differ about 1 degree from one another, although the angles may differ in a greater or less degree than that mentioned, if found desirable or necessary. In addition to the above described construction I render the spigot end of the spigot section elastic in one of the several manners hereinafter described and illustrated in the drawing.

In Figs. 1 and 2 the spigot end 9 of the spigot section is formed with an elastic lip 12, which is produced by forming the edge of the spigot end inclined or inwardly beveled as at 13, at an angle to the longitudinal axis of the section, such inclination or bevel extending from the outer to the inner surface of the spigot end. In Fig. 6, the same result is effected, that is an elastic lip is produced at the edge of the spigot end, but in this form the end of the lip is beveled as at 14, from a point within the outer corner of the spigot end to the inner wall thereof, the bevel in this instance being at a more acute angle to the inner surface of the spigot end than in Figs. 1 and 2.

In Figs. 2 and 3 the elastic lip 12 is produced by forming an annular groove 15, of substantially V shape in cross section, in the edge or extremity of the spigot end.

In Fig. 5, the outer edge of the lip 12 is cut away so that the portion of the edge of the spigot end within the groove 15 will project beyond the lip 12, this construction being provided in order to protect the lip 12 from injury during handling or transportation of the pipe.

In Fig. 7, the construction of the contacting surfaces of the spigot end and the faucet end of the pipe coupling is the same as in Figs. 1 to 6, but in this figure I have illustrated an application of my improvement to the coupling together of a wrought iron pipe and a cast iron T joint 17. The section 16 in this figure is formed with a screw thread 18, and with a spigot end 19 which latter is comparatively elastic for the described purpose and is formed with a tapered external surface 20 the normal angle of this surface, before the joint is made, being at a more acute angle to the longitudinal axis of the pipe than the tapering surface 21 of the socket in the T joint 17, so that when the joint is made, the spigot end of section 16 will be compressed inwardly so as to cause the external surface of the spigot end to conform in its angle to that of the socket from the extremity of the spigot end to a point considerably in the rear thereof, or, preferably throughout its entire surface. The T joint 17 is screw threaded to receive the screw threaded portion of the section 16 and is formed as shown with a socket and screw thread at the opposite end and with a lateral branch, also formed with a similar screw thread and socket.

In the forms shown in Figs. 1 to 6, the lip 12, is compressed inwardly when the pipe sections are drawn forcibly together by the bolts 7 and nuts 8, and thus the tapered surfaces of the spigot end and the socket in the faucet end are made to conform and come into close contact throughout a considerable portion of the length of both and thus produce a tight joint and also an extensive surface in close contact, thus securing good contact for electric conduction. This effect of long contacting surfaces is secured by reason of the elasticity of the lip on the spigot end even if the several pipe sections are at a slight angle to one another.

In the form shown in Fig. 7, the entire spigot end is compressed when the pipe section is screwed into the T joint and the desired effect thereby produced. In this form of coupling the taper of the socket, and the taper of the spigot or entering member are at different angles, as in the other forms illustrated.

In Fig. 8, I show a modification in which one of the coupling members instead of being made integral with the pipe section, is made in the form of a thimble 21, both sections of the pipe in this construction, being provided with faucet ends 3, 3, and the thimble 21, being tapered inwardly at both ends and provided at each end with an elastic lip 23.

I claim:

1. In a pipe coupling a section having an elastic externally tapered spigot end, in combination with a section having an internally tapered open bowl, the taper of the spigot and the taper of the bowl being at different angles and the spigot having contact with the bowl at the outer angle only of the spigot section.

2. In a pipe coupling, the combination with a member having an externally tapered spigot terminating at its end and outer angle in an elastic lip, of a member having an internally tapered open bowl, the taper of the spigot and bowl being at different angles and the spigot contacting with the bowl at the outer angle only of the spigot.

3. A cast metal pipe having, at one end, an integral open bowl with a tapered inner surface and at the other end an integral elastic, tapered, spigot, the taper of the spigot and the taper of the bowl being in the same direction, and each in one direction only, the taper of the spigot being of less pitch than the taper of the bowl.

4. A cast metal pipe having at one end an integral interiorly tapered open bowl and at the other end an integral elastic tapered spigot, the taper of the spigot and the taper of the bowl being in one direction only and the taper of the spigot being of less pitch than the taper of the bowl.

5. In a pipe coupling, the combination with a spigot section having a spigot end, said spigot end being formed with a groove in its edge, and an elastic lip outside of said groove a portion of the edge of the spigot end within the groove projecting beyond said lip, of a faucet section having a socket receiving the spigot end of the spigot section.

In testimony whereof I affix my signature, in presence of two witnesses.

CHARLES R. SCHMIDT.

Witnesses:
 Thos. A. Connolly,
 Jos. B. Connolly.